March 2, 1965　　J. GOODMAN, JR　　3,172,038
DOUBLE BRIDGE CIRCUIT FOR MEASURING RESISTANCE OF
ENERGIZED ALTERNATING CURRENT APPARATUS
Filed Dec. 19, 1960
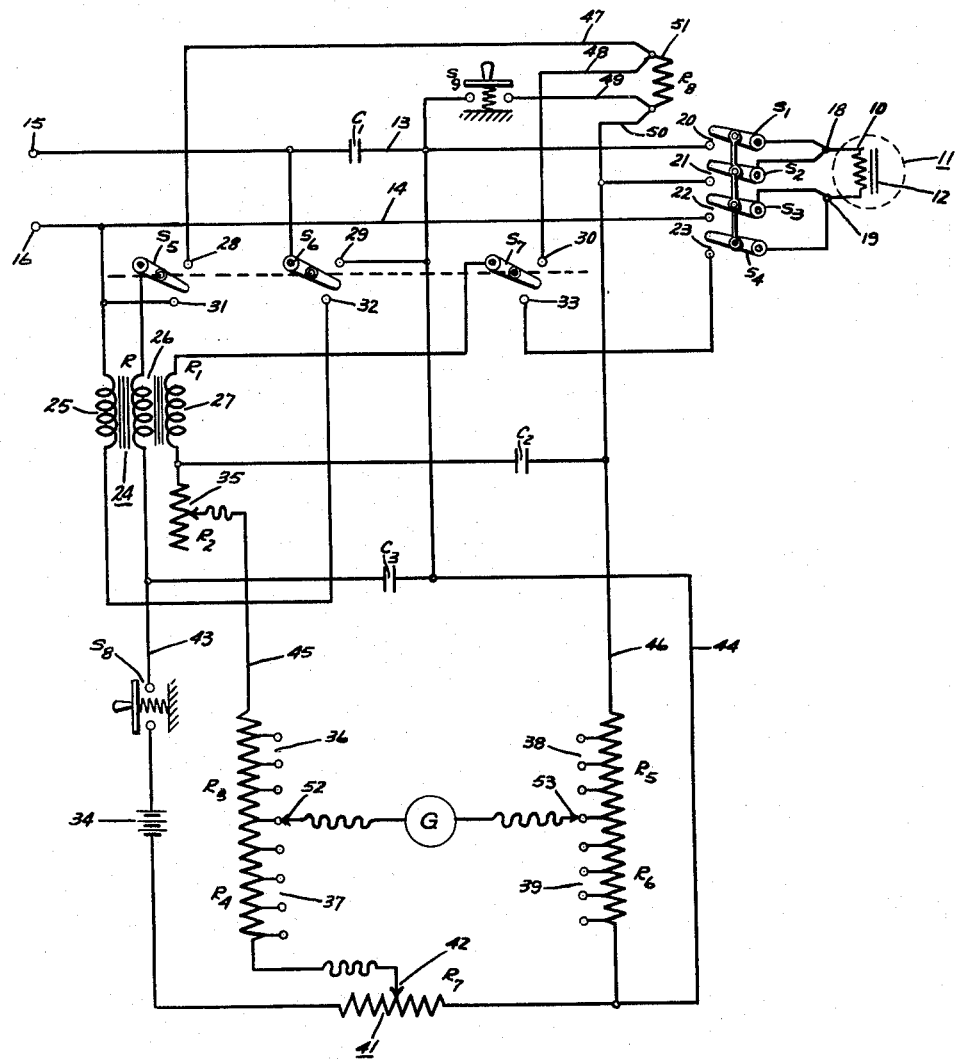
*Inventor:*
*Joe Goodman, Jr,*
by *Henry J. Marciniak*
*Attorney.*

United States Patent Office 3,172,038
Patented Mar. 2, 1965

3,172,038
DOUBLE BRIDGE CIRCUIT FOR MEASURING RESISTANCE OF ENERGIZED ALTERNATING CURRENT APPARATUS
Joe Goodman, Jr., Fort Wayne, Ind., assignor to General Electric Company, a corporation of New York
Filed Dec. 19, 1960, Ser. No. 76,788
4 Claims. (Cl. 324—62)

This invention relates to electrical circuits for measuring resistance and more particularly to an electrical circuit for measuring the resistance of alternating current apparatus while it is energized.

In many electrical applications it is desirable to measure the resistance of alternating current apparatus, such as the stator winding of a motor or the primary winding of a transformer, while it is energized. A device employing a bucking transformer and commonly known as a "Seely box," which is described and claimed in U.S. Patent No. 2,578,455, assigned to the assignee of the present application, makes it possible to connect a direct current Wheatstone bridge to alternating current electrical apparatus and make resistance measurements while the apparatus is energized from an alternating current power supply.

The Seely box has been used extensively in conjunction with the Wheatstone bridge to measure the resistance of the windings of motors and transformers while energized. While it has proved eminently satisfactory for such applications, there is a need for a somewhat more sensitive circuit for making D.C. measurements of the resistance of electrical apparatus while the apparatus is energized. Further, it is desirable that such a circuit permit resistance measurements to be made directly and that it does not have inherent limitations of the Wheatstone bridge.

Accordingly, a general object of the invention is to provide an improved circuit for measuring the resistance of electrical apparatus while energized from an alternating current source.

A more specific object of the invention is to provide an improved circuit for measuring the resistance of electrical apparatus while energized which measures only the resistance of the apparatus.

It is a further object of the invention to provide a new and improved circuit for measuring the resistance of a load energized from an alternating current source in which the components required to block the alternating current voltage from the bridge circuit are a part of the bridge.

In accordance with one aspect of the present invention, there is provided a circuit for measuring the resistance of an electrical apparatus or load energized from an alternating current source in which the components of the alternating current voltage blocking means serve as a part of a double bridge. The double bridge includes a bridge arm, a pair of main ratio arms and a pair of auxiliary ratio arms interconnected by a current detecting or galvanometer branch. A direct current source is connected in the double bridge to provide the direct current used to measure the resistance of the energized load, to which a pair of potential leads and a pair of current leads are connected by means of a pair of load terminals. The potentials leads are brought out from one of the main ratio arms and from one of the auxiliary ratio arms, a first portion of the resistance introduced by the alternating current voltage blocking means serving as a part of the ratio arm resistance. The current leads connect the current circuit of the double bridge with the load terminals. A second portion of the resistance of the blocking means is included in the current circuit of the double bridge. A direct current blocking means is also provided to prevent the direct current from passing outside the measuring circuit. By balancing the double bridge, the resistance of the load terminal is measured directly while the load or apparatus is energized from the alternating current source.

The subject matter which I have regarded as my invention is set forth in the appended claims. The invention itself, however, together with further objects and advantages thereof may be understood by referring to the following description taken in connection with the figure of the accompanying drawing which is a schematic circuit diagram of a circuit for measuring the resistance of an electrical apparatus while energized from an alternating current source in accordance with the invention.

Referring now to the figure of the drawing, there is shown a winding 10 of an electrical apparatus or load generally identified as 11, such as, for example, the stator winding of a motor or the primary winding of a transformer, which may be provided with a core member 12. In order to energize the load for operation during measurement, a pair of conductors 13, 14 are connected to terminals 15, 16 which are provided for connection to a suitable alternating current source (not shown). A capacitor $C_1$ is connected in the line 13 for the purpose of preventing the direct current utilized in making the resistance measurement from leaving the circuit as will hereinafter be more fully explained.

Grouped switches $S_1$, $S_2$, $S_3$, $S_4$ are provided to connect terminals 20, 21, 22, 23 to the load 11. It will be seen that when these switches are in a closed position a four terminal connection is made with load terminals 18, 19 and conductors 13, 14 are connected across load terminals 18, 19. Thus, when terminals 15, 16 are connected to a power source, the voltage of the power source is applied across the load or apparatus 11.

A transformer 24, having a primary winding 25, a first secondary winding 26, and a second secondary winding 27, serves as a first and second voltage blocking means and provides a bucking voltage to prevent the alternating current voltage at load 11 from being applied to other parts of the circuit. Grouped switches $S_5$, $S_6$, $S_7$ connected to the transformer windings are of the double throw type in order to provide two control positions. When switches $S_5$, $S_6$, $S_7$ engage contacts 28, 29, 30, they are in a "calibration" position. When they engage the contacts 31, 32, 33, they are in an "on" position. Thus, switches $S_5$, $S_6$, $S_7$ permit the circuit to be calibrated while the load 11 is energized.

The secondary windings 26 and 27 of the transformer 24 are so wound that the voltage across each of them is substantially equal to and 180 degrees out of phase with the voltage across the load 11. To provide such voltages, the secondary windings 26 and 27 are each in a one-to-one ratio with primary winding 25. Therefore, the secondary windings 26 and 27 of transformer 24 function as a first and second voltage blocking means, respectively. Further, it will be seen that the secondary winding 26 is connected in series circuit relationship with a direct voltage source 34 while secondary winding 27 is connected in circuit with a variable resistor 35 and a fixed resistor included in the main ratio arm 36 of a double bridge.

It will be appreciated that resistor 35 and secondary 27 are in effect a part of the main ratio arm 36 of the double bridge. The double bridge also includes a main ratio arm 37, auxiliary ratio arms 38, 39, a current detecting means such as a galvanometer G, a resistance measuring bridge arm 41 having an adjustable contact 42, the direct current voltage source 34, switch $S_8$, current leads 43, 44 and potential leads 45, 46. A four terminal connection is provided by conductors 47, 48, 49, 50 to a standard resistance 51 for the purpose of calibrating the double bridge. When grouped switches $S_5$, $S_6$, $S_7$ are set so that they engage contacts 28, 29, 30, respectively, the circuit of the invention is arranged for calibration.

Grouped switches $S_1$, $S_2$, $S_3$, $S_4$ may be left in either an open or closed position. If desired, the load 11 may be energized while the bridge is being calibrated. Switch $S_9$ is provided for the purpose of preventing lines 13 and 46 from being shorted before they are connected with the load by switches $S_1$, $S_2$.

In order to provide a low impedance path for alternating current and a high impedance path for direct current, a capacitor $C_2$ is connected across the potential leads 45, 46 and capacitor $C_3$ is connected across the current leads 43, 44. Thus, the capacitors $C_2$ and $C_3$ prevent alternating current resulting from small variations in the voltages across the secondary windings 26, 27 from being applied across the potential leads 45, 46 and the current leads 43, 44.

Secondary windings 26, 27 are placed in the circuit so that normal changes in their resistance, R and $R_1$, respectively, will not affect the accuracy of the double bridge measurements. It will be noted that secondary winding 26 is connected in circuit with current lead 43 and has no appreciable effect on the bridge measurements. The only limitation on the resistance R of the secondary winding 26 is that it be small enough to permit large currents to flow. If a battery is used as the direct current power source 34, increasing the amount of resistance R will necessitate using a larger battery. Therefore, the value of resistance R should be kept as small as practicable. Thus, even substantial changes in the resistance R of the secondary winding 26 will have only a negligible effect on the sensitivity of the double bridge and no effect on the accuracy of the bridge measurement. Since the sum of resistance $R_2$ of the variable resistor 35 and the resistance $R_3$ of the main ratio arm $R_1$ can be made relatively large as compared with the resistance $R_1$ of the secondary winding 27, normal changes in resistance $R_1$ due to the temperature of the winding 27 will not have any appreciable effect on the accuracy of the bridge measurement. Moreover, if before each measurement of load resistance the bridge is calibrated and the resistance $R_2$ adjusted, it will be seen that any error due to the temperature of the winding 27 will be eliminated.

In order that proper adjustments during calibration can be made with the resistance $R_2$ of the variable resistor 35, resistance $R_5$ should be greater than the sum of resistance $R_3$ and resistance $R_1$. The resistance $R_6$ of the auxiliary ratio arm 39 it matched with resistance $R_4$ of the main ratio arm 37. Different bridge ratios can be obtained by selectively adjusting the movable contact arms 52, 53 to another tap to provide a different fixed value for the resistances $R_4$ and $R_6$. It will be appreciated that if the bridge ratio is increased, the galvanometer sensitivity must also be increased.

The circuit of the invention utilizes the double bridge to effect D.C. resistance measurements of the load 11 while it is energized from an alternating current source. The operation and theory of the double bridge is well known and is described at pages 16 to 18 of section 5 in the 1943 impression of the third edition of the Electrical Engineers' Handbook, Electric Power (Wiley Engineering Handbook Series). The resistance measured by the circuit is the resistance between the bridge terminals 18, 19. Thus, where the double bridge has a one-to-one ratio, the load resistance between the terminals 18, 19 under the condition of zero current is equal to the resistance $R_7$ on the bridge arm 41. If other bridge ratios are employed, the load resistance under zero current condition is equal to resistance $R_7$ multiplied by the bridge ratio which is the sum of $R_1$, $R_2$ and $R_3$ divided by $R^4$.

Capacitor $C_1$ serves as a current blocking means and prevents the direct current from the battery 34 from leaving the double bridge. It was found that for 60 cycle operation it is necessary to use a minimum of 1,000 microfarads of capacitance for each ampere of alternating current supplied to the load 11. Although it was discovered that leakage current on the capacitor $C_1$ may introduce an error that might affect the accuracy of the bridge measurement, this error can be readily minimized by maintaining the direct current supplied to the load 11 at no less than 250 times the total capacitor leakage current.

In order to operate the circuit of the invention, it is necessary to first calibrate the bridge. The bridge is calibrated by adjusting the resistance $R_2$ of the variable resistor 35 so that the ratio of the sum of the resistances $R_1$, $R_2$ and $R_3$ to the resistance $R_4$ is equal to the ratio of resistance $R_5$ to resistance $R_6$. This is accomplished in the following manner. Grouped switches $S_5$, $S_6$, $S_7$ are placed in the "calibration position" so that contacts 28, 29, 30 are engaged. Switches $S_8$, $S_9$ are then closed. The movable contact 42 of the bridge arm 41 is set to provide a value of the resistance $R_7$ which is equal to the resistance $R_8$ of the calibration resistor 51. The variable resistor 35 is adjusted until the galvanometer indicates zero deflection. When the galvanometer indicates zero deflection, the bridge is then in balance and properly calibrated against the resistance $R_8$.

To measure the resistance of the load 11, the switch $S_9$ is opened and grouped switches $S_5$, $S_6$, $S_7$ are shifted to the "on" position to engage contacts 31, 32, 33. The grouped switches $S_1$, $S_2$, $S_3$, $S_4$ are then closed. The movable contact 42 of the bridge arm 41 is adjusted until the galvanometer G indicates zero deflection. If the bridge has a one-to-one ratio, the ohmic value of $R_7$ will be equal to the resistance of the load 11 while it is energized from an alternating current source.

During the operation of the bridge, the voltages induced in the secondary windings 26 and 27 effectively cancel out the alternating current voltage insofar as the bridge is concerned. The direct current in the bridge circuit is prevented from traveling out through line 13 to the power source by the capacitor $C_1$. Thus, a D.C. measurement of resistance is affected of the load 11 while it is energized from an alternating current source.

From the foregoing description, it will be seen that the double bridge arrangement has the advantage that it can be easily calibrated before each resistance measurement without disconnecting the load from the circuit or the power supply. The circuit of the invention provides an improved means for accurately measuring the resistance of an energized load and is particularly suitable for measuring the resistance of load such as transformer primaries and motors.

While this invention has been explained by describing a particular embodiment thereof, it will be appreciated that many modifications may be made. It is to be understood, therefore, that I intend by the appended claims to cover all such modifications as fall within the true spirit and scope of the invention.

What I claim as new and desire to secure by Letters Patent of the United States is:

1. A circuit for measuring the resistance of electrical apparatus while energized from a source of alternating current power comprising means connecting said apparatus to the power source, a transformer having a primary winding connected across said alternating current source and including a first secondary winding and a second secondary winding, said secondary windings respectively being connected through separate terminals with said apparatus and wound to develop voltages substantially equal to and 180 degrees out of phase with the voltage across said electrical apparatus; a double bridge circuit comprising a pair of main ratio arms, a pair of auxiliary ratio arms, wherein the ratio of resistance of one of the main ratio arms to the other is equal to the ratio of resistance of one of the auxiliary ratio arms to the other auxiliary ratio arm, current detecting means interconnecting the main and auxiliary ratio arms for indicating balanced current flow through said main and auxiliary ratio arms, a variable resistor including indicating means and an adjustable bridge arm connected in circuit with one of said main ratio arms and one of said auxiliary ratio arms so that when the bridge arm is adjusted, said means indicates the resistance of said load when the current detecting means shows balanced current flow through the main and auxiliary ratio arms, a direct current source connected with said variable resistor and with said first secondary winding, a pair of potential leads, one of said potential leads being connected to one of said main ratio arms and the second secondary winding, and the other of said potential leads being connected to said auxiliary ratio arms, and a pair of current leads, one of said current leads being connected to said direct current source and the other of said current leads being connected in circuit with said variable resistor and one of said auxiliary ratio arms; a first and second terminal for connection across said apparatus; a first circuit means connecting said first secondary winding and said current leads in circuit with said first and second terminals, said resistance of said first secondary having no appreciable effect in said bridge circuit; a second circuit means connecting said second secondary winding and said potential leads in circuit with said first and second terminals, said resistance of said second secondary winding contributing a portion of the resistance of said bridge; and direct current blocking means connected in circuit with said terminals to block direct current from passing said circuit.

2. The circuit set forth in claim 1 wherein a low impedance path is provided across the current leads and across the potential leads of said bridge to prevent alternating current from entering the bridge circuit and adversely affecting the operation of said current detecting means.

3. A circuit for measuring the resistance of a load while energized from an alternating current source comprising a transformer having a primary winding connected across said alternating current source and a first and a second secondary winding inductively coupled in a one-to-one ratio with said primary, said secondary windings being respectively connected through separate terminals with said load and wound to develop voltages substantially equal to and 180° out of phase with the voltage of said load; a double bridge including a pair of main ratio arms and a pair of auxiliary ratio arms wherein the ratio of resistance of one of the main ratio arms to the other is equal to the ratio of resistance of one of the auxiliary ratio arms to the other auxiliary arm, current detecting means interconnecting the main and auxiliary ratio arms for indicating current flow through said main and auxiliary arms, a variable resistor including indicating means and an adjustable branch arm, a direct current source connected to said variable resistor, said variable resistor being connected in circuit with one of said auxiliary ratio arms and one of said main ratio arms so that when the branch arm is adjusted, said means indicates the resistance of said load when the current detecting means shows balanced current flow through the main and auxiliary ratio arms; a first circuit means connecting one end of one of said auxiliary ratio arms and said branch arm in circuit with a first of said terminals and connecting said direct current source and said first secondary winding in circuit with a second of said terminals; a second circuit means connecting said second secondary of said transformer in series with one of said main ratio arms and in circuit with said second terminal and connecting one of said auxiliary ratio arms in circuit with said first terminal; said secondary windings providing a bucking voltage to prevent the voltage across said apparatus from being applied to said bridge, the resistance of said second secondary winding serving as a part of the resistance of one of said ratio arms.

4. An electrical circuit for measuring the resistance of an electrical apparatus energized from an alternating current source comprising a transformer having a primary winding connected across said source and a first and second secondary winding respectively connected with a first and a second pair of terminals connected to said apparatus, a bridge comprising a first and second main ratio arm, a first and a second auxiliary ratio arm, said main ratio arms having a common junction and said auxiliary arms having a common junction, a galvanometer joining said common junctions, means comprising a current circuit connected across the apparatus and including said first secondary winding and a direct current source serially connected with an indicating and adjustable resistor, a potential circuit connected across the apparatus and including said secondary winding, an adjustable resistance element and said main and auxiliary ratio arms and said indicating and adjustable resistor, said adjustable resistance element being variable to change the resistance balance of said main and auxiliary ratio arms to achieve zero current flow through the bridge, and said adjustable resistor being adjustable to show the resistance of the apparatus when current flow through the galvanometer is zero.

References Cited by the Examiner
UNITED STATES PATENTS

| | | | |
|---|---|---|---|
| 2,578,455 | 12/51 | Seely | 324—62 |
| 2,825,027 | 2/58 | Seely | 324—62 |
| 2,912,644 | 11/59 | Makons | 324—62 |

WALTER L. CARLSON, *Primary Examiner.*
SAMUEL BERNSTEIN, *Examiner.*